Figure 1:
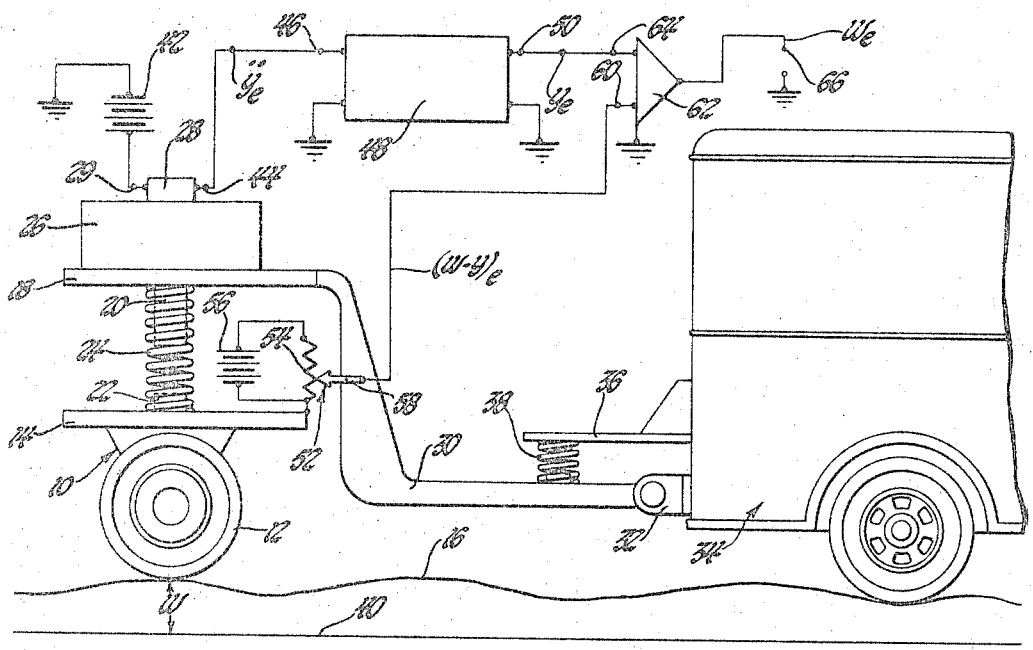

INVENTOR.
Elson B. Spangler, &
BY  William J. Kelly

ATTORNEY

United States Patent Office 3,266,302
Patented August 16, 1966

3,266,302
DISPLACEMENT MEASURING MEANS
Elson B. Spangler, Bloomfield Hills, and William J. Kelly, Clawson, Mich., assignors to General Motors Corporation, Detroit, Mich., a corporation of Delaware
Continuation of application Ser. No. 239,708, Nov. 23, 1962. This application June 9, 1965, Ser. No. 462,650
7 Claims. (Cl. 73—105)

This application is a continuation of Serial No. 239,708, filed November 23, 1962, now abandoned.

This invention relates to means for measuring displacements and more particularly for measuring displacements of a body subjected to variable frequency motion in a given direction.

Frequently, applications arise wherein it is desirable that means be provided for accurately measuring displacements of a body which is subjected to variable frequency motion in a given direction. For example, when designing vehicle suspension systems, road simulators are frequently used to simulate actual road conditions. Such a simulator may take the form of an electromechanical device wherein input electrical signals taken from a magnetic tape representative of a particular road profile are used to actuate mechanical means connected with a vehicle suspension system in a manner to simulate actual road conditions. In such an application it is important that an accurate system be used for measuring the road profile to be recorded on the magnetic tape. One form of the prior art for measuring road profile includes a vehicle adapted to be towed by another vehicle over the surface of a road under study. An accelerometer is mounted on the towed vehicle responsive to acceleration thereof in a given direction and operative to develop an output signal variable in accordance therewith. Suitable computing means are connected with the accelerometer for developing an output signal variable in accordance with the extent of the displacements of the towed vehicle in the given direction. However, the device described does not accurately measure displacements of the vehicle due to surface undulations or waves extending over a range from low frequency-long waves to high frequency-short waves. This is true because an accelerometer which is responsive to displacements of the vehicle due to high-frequency short wave surface undulations must be capable of measuring large acceleration forces. The use of such an accelerometer results in poor noise to signal ratio when used for measuring acceleration due to low frequency-long wave displacements of the vehicle.

In accordance with this invention, means are provided for accurately measuring the profile of a surface with respect to an inertial reference plane by the displacements of portions of a body which is passed over the surface thereby to be subjected to variable frequency motion in a given direction. This is accomplished by providing a frequency selective coupling between the surface to be measured and motion sensing means for purposes of transmitting motion of low frequency to the motion sensing means and attenuating motion of higher frequency. The motion sensing means, which may take the form of an accelerometer with suitable integrators, is operative to develop first output signals in accordance with motion of the body with respect to the inertial reference plane at the low frequency. Measuring means are also provided for developing a second output signal variable in accordance with the extent of relative displacements between the portion of the body carrying the motion sensing means and the surface. Accordingly, the output signals developed by the motion sensing means and the measuring means may be summed with suitable means to obtain an output signal variable in accordance with the extent of displacements of the body throughout the frequency range of body motion.

Figure 2:
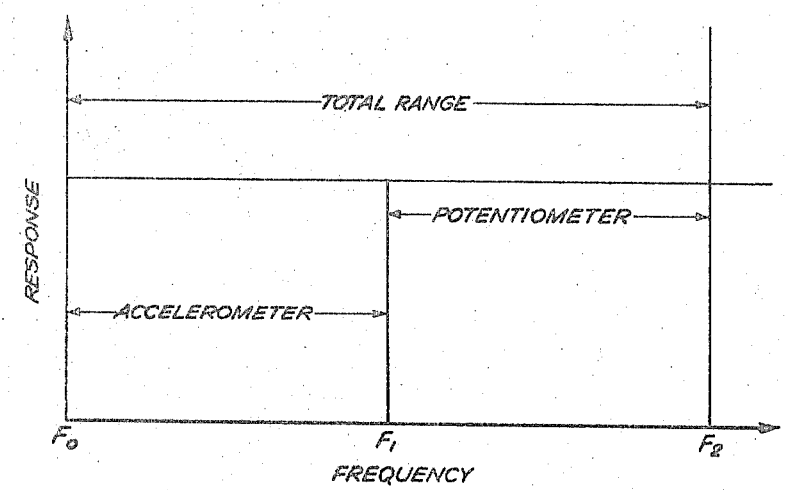

A more complete understanding of this invention may be had from the detailed description which follows taken with the accompanying drawing in which:

FIGURE 1 is a schematic representation of one embodiment of the invention, and
FIGURE 2 is a graphical representation illustrating the total frequency range of operation.

Referring now to the drawing and more particularly to FIGURE 1, there is shown a towed vehicle 10 including a rotatable member in the form of a wheel 12 rotatably mounted to a wheel support 14 and adapted to traverse the surface of a road 16. A vehicle platform 18 is provided having mounted thereon on one side a cylindrical member 20 coaxially aligned with a similar cylindrical member 22 mounted on the wheel support 14. A helically shaped coil spring 24 coaxially surrounds both members 20 and 22 with one end mounted on the support member 14 and the other end mounting the platform 18. The spring 24 supports the weight of the platform 18 and the plunger member 20 as well as a mass 26 mounted on the other side of the platform 18.

A tow rod 30 is provided having one end pivotally mounted to a support member 32 mounted on the rear of a towing vehicle 34 and having its other end rigidly connected with the platform 18. Wheel hold-down means are provided for exerting a hold-down force on the wheel 12 and include a rigid member 36 securely fastened in centilever fashion to the rear of the towing vehicle 34 and a coil spring 38 interposed between the tow rod 30 and the member 36. The spring 38 is preferably biased so that it provides a force moment acting in a counterclockwise direction about the pivot support means 32, as depicted in FIGURE 1, to provide sufficient hold-down force on the vehicle 10 to maintain the periphery of the wheel 12 in frictional contact with the surface of the road 16 as the wheel traverses the road. In one embodiment of the invention, a wheel hold-down force approximately ten times the weight of the vehicle 10 was found to be sufficient to maintain the periphery of the wheel in contact with the surface of the road.

In accordance with this invention, surface undulations of the road 16 are measured by measuring displacements of the wheel 12 normally of and with respect to a reference direction as the wheel traverses and maintains contact with the road. The reference direction may take the form of a plane 40 parallel to the average slope of the road 16 over the distance of road surface to be studied. Displacements of the wheel 12 with respect to the plane 40 are designated as W, as indicated in FIGURE 1. Furthermore, in order to accurately measure the displacements W throughout the frequency range of surface undulations of the road 16 the spring 24 serves as frequency selective coupling means adapted to transmit acceleration of the wheel 12 to the mass 26 below a predetermined or break frequency and to attenuate acceleration above the predetermined frequency. Acceleration of the wheel 12 of a frequency in excess of the predetermined frequency will result in relative displacements between the wheel 12 and the platform 18 as the vehicle 10 traverses the road 16. Hence the surface undulations of the road 16 may be represented by:

$$W = (W - Y) + \int\int \ddot{Y} \qquad (1)$$

where:
W is a displacement of the wheel 12 normally of and with respect to the plane 40 due to a surface undulation in the road 16;
Y is the change of position of the mass 26 normally of and with respect to the plane 40 due to a displacement W of the wheel 12 resulting in an acceleration below the break frequency of the spring 24;

$\ddot{Y}$ is the second order time derivative representing the acceleration of the mass 26 normally of the plane 40 due to a change of position Y of the mass 26; and $(W-Y)$ is the relative displacement between the mass 26 and the wheel 12 due to a displacement W of the wheel 12 resulting in an acceleration exceeding the break frequency of the spring 24.

Equation 1 may be solved electrically with the following apparatus. The acceleration $\ddot{Y}$ of the mass 26 normally of the plane 40 is measured with an accelerometer 28 which is mounted on the mass 26 and has a voltage source 42 connected between ground and an input terminal 29 of the accelerometer. The accelerometer 28 is responsive to acceleration of the mass 26 normally of the plane 40 below the break frequency of the spring 24 and is operative to develop an output signal voltage $\ddot{Y}_e$ between ground and an output terminal 44 of the accelerometer which varies in accordance with acceleration of the mass. Preferably, the accelerometer 28 exhibits a low noise to signal ratio for low frequency-long wave acceleration below the break frequency of the spring 24. The output signal voltage $\ddot{Y}_e$ of the accelerometer 28 is applied between ground and an input terminal 46 of computing means in the form of an integrating device 48. The integrating device 48 is responsive to the output signal voltage $\ddot{Y}_e$ and is operative to perform a double integration thereof and develop an output signal voltage $Y_e$ between ground and an output terminal 50 of the integrating device which varies in accordance with the extent of the change of position Y of the mass 26.

Displacement measuring means in the form of a potentiometer 52 is provided between the wheel 12 and the accelerometer 28 for purposes of developing an output signal voltage $(W-Y)_e$ which varies in accordance with the extent of relative displacement $(W-Y)$ between the mass 26 and the wheel 12. The potentiometer 52 includes a resistance element 54 having a voltage source 56 connected thereacross and a wiper arm 58. The resistance element 54 and the wiper arm 58 are mechanically mounted to the wheel support 14 and the tow rod 30, respectively, in the manner as shown in FIGURE 1 so that the resistance element 54 is in slidable engagement with the wiper arm 58 in a plane approximately parallel to the longitudinal axes of members 20 and 22. Since it is desirable that the output signal voltage $(W-Y)_e$ be indicative of the relative displacement $(W-Y)$ between the wheel 12 and the platform 18 due to a displacement of the wheel normally of the plane 40, it is preferable that the tow rod 30 be so positioned to maintain the longitudinal axes of members 20 and 22 approximately perpendicular to the plane 40. The output signal voltage $(W-Y)_e$ of the potentiometer 52 is obtained between ground and the wiper arm 58 and is applied between ground and an input terminal 60 of an electrical summing amplifier 62. The output signal voltage $Y_e$ of the integrating device 48 is applied between ground and another input terminal 64 of the summing amplifier 62. The summing amplifier 62 is operative to electrically sum the output signal voltages $Y_e$ and $(W-Y)_e$ and develop an output signal voltage $W_e$ between ground and an output terminal 66. The output signal voltage $W_e$ varies in accordance with the extent of the surface undulations of the road 16 with respect to the plane 40.

Suitable recording means (not shown) may be connected with output terminals 66 of the summing amplifier 62 for recording the output signal voltage $W_e$ on magnetic tape. Separate recording means (not shown) may be provided for recording on magnetic tape the velocity of vehicle travel over the road 16 at the same time as the output signal voltage $W_e$ is recorded. The tape recording of velocity may then be compared with that of the output signal voltage $W_e$ in a manner to obtain a third magnetic tape recording of output signal voltage $W_e$ as a function of distance travelled. Hence, constant vehicle velocity need not be maintained during recording.

The operation of the invention may be better understood from the following description. Assume that the total frequency range of surface undulations of the road 16 extends from $F_0$ to $F_2$ and that the break frequency of the spring 24 is $F_1$, as indicated in the graphical representation shown in FIGURE 2. Then as the vehicle 18 is towed along the road 16 the wheel 12 will undergo displacements normally of the plane 40 due to the surface undulations of the road. Acceleration of the wheel 12 within the frequency range of $F_1$ to $F_2$ will be attenuated by the spring 24, and only acceleration of the wheel in the frequency range of $F_0$ to $F_1$ will be transmitted by the spring to the mass 26. The accelerometer 28 will be responsive to the low frequency acceleration of the mass 26 and develop an output signal voltage $\ddot{Y}_e$ which will be applied across the input of the integrator 48 to develop an output signal voltage $Y_e$. Hence, the output signal voltage $Y_e$ will vary in accordance with change of position of the wheel 12 with respect to the plane 40 due only to surface undulations of the road 16 within the frequency range from $F_0$ to $F_1$. The displacements of the wheel 12 due to surface undulations of the road 16 within the frequency range from $F_1$ to $F_2$ result in relative displacements between the platform 18 and the wheel support 14 and which are measured by the potentiometer 52. Hence the output signal voltage $(W-Y)_e$ of the potentiometer will vary in accordance with the displacements of the wheel 12 due only to surface undulations of the road 16 within the frequency range from $F_1$ to $F_2$. The output signal voltages $Y_e$ and $(W-Y)_e$ are applied between ground and the respective input terminals 64 and 60 of the summing amplifier 62 for developing an output signal voltage $W_e$ which will vary in accordance with the extent of surface undulations of the road 16 with respect to the plane 40 over the entire frequency range from $F_0$ to $F_2$.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

We claim:

1. Means for measuring the extent of surface undulations of an object throughout the frequency range of the undulations with respect to a reference direction and comprising:

surface contacting means adapted to traverse and maintain contact with the surface of the object under examination, acceleration responsive means adapted to be connected with a voltage source for developing an output signal voltage variable in accordance with acceleration of the contacting means normally of the reference direction due to surface undulations below a predetermined frequency, frequency selective coupling means interposed between the acceleration responsive means and the contacting means and adapted to transmit acceleration below the predetermined frequency and to attenuate acceleration above the predetermined frequency, integrating means connected with the acceleration responsive means responsive to the output signal voltage developed thereby and operative to perform a double integration thereof and develop an output signal voltage variable in accordance with the extent of surface undulations of the object below the predetermined frequency, displacement measuring means interposed between the contacting means and the acceleration responsive means and adapted to be connected with a voltage source for developing an output signal voltage variable in accordance with the extent of relative displacements between the contacting means and the acceleration responsive means due to acceleration of the contacting means above the predetermined frequency, and summing means connected with the integrating means and the measuring means for summing the output signal voltages developed thereby and operative to develop an output signal voltage variable in accordance with the extent of surface undulations of the object throughout the frequency range of the undulations.

2. Means for measuring the extent of surface undulations of a road throughout the frequency range of the undulations with respect to a reference direction and comprising:

a vehicle including a rotatable member adapted to traverse the surface of the road under examination, hold down means connected with the vehicle for providing a hold down force on the rotatable member to maintain the rotatable member in contact with the surface of the road, an accelerometer mounted on the vehicle adapted to be connected with a voltage source for developing an output signal voltage variable in accordance with acceleration of the rotatable member normally of the reference direction due to surface undulations below a predetermined frequency, a spring member connecting the accelerometer with the rotatable member and adapted to transmit acceleration below the predetermined frequency and to attenuate acceleration above the predetermined frequency, integrating means connected with the accelerometer responsive to the output signal voltage developed thereby and operative to perform a double integration thereof and develop an output signal voltage variable in accordance with the extent of surface undulations of the road below the predetermined frequency, a potentiometer connected between the rotatable member and the accelerometer and connected with a voltage source for developing an output signal voltage variable in accordance with the extent of relative displacements between the accelerometer and rotatable member due to acceleration of the rotatable member above the predetermined frequency, and summing means connected with the integrating means and the potentiometer for summing the output signal voltages developed thereby and operative to develop an output signal voltage variable in accordance with the extent of surface undulations of the road throughout the frequency range of the undulations.

3. Apparatus for measuring displacements of a body in a predetermined direction over a frequency range including high and low frequency components comprising:

motion sensing means for producing a first signal related to the displacement of the motion sensing means in the predetermined direction, frequency selective coupling means mechanically connecting the body and the motion sensing means and operative to transmit low frequency components of displacement and to attenuate high frequency components of displacement, means for producing a second signal related to the high frequency components of displacement attenuated by the coupling means, and summing means connected to receive the first and second signals and responsive thereto to produce an output signal corresponding to displacements of both high and low frequency components.

4. Apparatus for indicating the profile of a surface including:

a body adapted to be displaced over the surface and including contact means for engaging the surface, support means, motion sensing means mounted on the support means and responsive to displacement thereof normal to the average plane of the surface to produce a first signal related to the displacement, resilient means connecting the body and the motion sensing means for transmitting relatively slowly occurring displacements of the body to the support means and attenuating relatively rapidly occurring displacements of the body, means operatively connected between the support means and the body for producing a second signal related to relative displacement between the body and the support means due to said relatively rapidly occurring displacements, and summing means connected to receive the first and second signals and responsive thereto to produce an output signal representing both relatively slowly and rapidly occurring displacements of the body.

5. Apparatus for measuring relative displacements between an inertial reference and a surface including:

a vehicular mass, motion sensing means mounted on the mass and responsive to acceleration thereof to produce a first signal related to the displacement of said motion sensing means relative to the inertial reference, means for establishing a frequency selective resilient support between the motion sensing means and the surface thereby to transmit relatively slowly occurring displacements of the surface to the motion sensing means and to attenuate relatively rapidly occurring displacements, means for producing a second signal related to displacements between the vehicular mass and the surface, and summing means connected to receive the first and second signals and responsive thereto to produce an output signal representing the profile of said surface with respect to the inertial reference.

6. Apparatus for measuring relative displacements between an inertial reference and a surface including:

a vehicular mass, motion sensing means mounted on the mass and responsive to acceleration thereof to produce a first signal related to the displacement of said motion sensing means relative to the inertial reference.

surface contact means, frequency selective coupling means mechanically connecting the motion sensing means and the surface contact means and operative to transmit relatively slowly occurring displacements of the surface to the motion sensing means and to attenuate relatively rapidly occurring displacements, means for producing a second signal related to displacements between the vehicular mass and the surface, and summing means connected to receive the first and second signals and responsive thereto to produce an output signal representing the profile of said surface with respect to the inertial reference.

7. Apparatus for measuring the profile of a surface with respect to an inertial reference plane including:

a vehicular mass having a surface contacting wheel to be passed over the surface, motion sensing means disposed on the mass and responsive to accelerations thereof to produce a first signal related to the displacement of said motion sensing means relative to the inertial reference, frequency selective resilient coupling means connecting the motion sensing means and the surface contact wheel and operative to transmit relatively slowly occurring displacements of the surface contact means to the motion sensing means and to attenuate relatively rapidly occurring displacements,
means disposed on said mass for producing a second signal related to displacements between the mass and the surface,
and summing means connected to receive the first and second signals and responsive thereto to produce an output signal representing the profile of said surface with respect to the inertial reference.

No references cited.

DAVID SCHONBERG, *Primary Examiner.*